Jan. 29, 1929.
J. KJEKSTAD
1,700,319
CONDUIT CONSTRUCTION
Filed Oct. 12, 1927
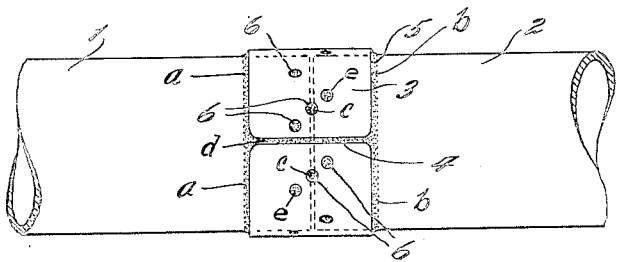
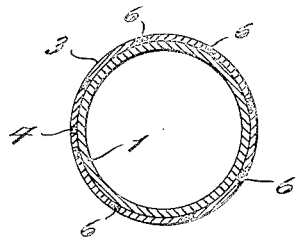
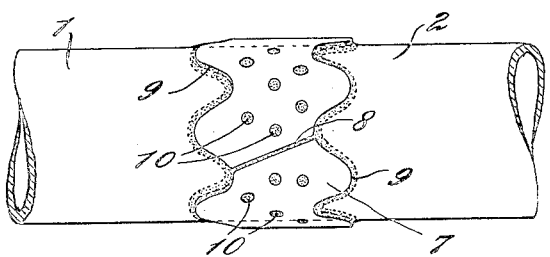
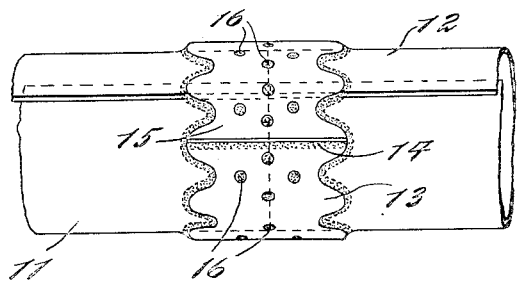
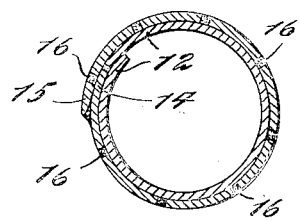
INVENTOR.
Johannes Kjekstad
BY Victor D. Borst
ATTORNEY Patented Jan. 29, 1929.

1,700,319

UNITED STATES PATENT OFFICE.

JOHANNES KJEKSTAD, OF BROOKLYN, NEW YORK.

CONDUIT CONSTRUCTION.

Application filed October 12, 1927. Serial No. 225,651.

This invention relates to conduit constructions, and particularly to the joining of abutting ends of conduit sections. Attempts have been made to connect abutting ends of metallic pipe sections by means of a metallic sleeve which surrounded the abutting ends of the sections and was secured thereto by welding. Such a form of connection, however, has been unsatisfactory for the reason that the connecting sleeve rarely fitted closely the abutting ends of the pipe sections which it received, and the sleeve was connected to the pipe sections solely along its end edges. As a result any flexure of the joined pipe sections at the joint caused relative movement of the pipe in the sleeve owing to the fact that there was but a single encircling line of connection between the sleeve and each section, and such movement frequently broke the welded connection.

Heretofore difficulty has also been experienced in securing pipe sections together by a welded sleeve owing to the fact that through expansion and contraction of the pipe sections, thus connected, during the welding operation, the weld was fractured at one point while being completed at another point.

An object of this invention is to provide an improved pipe or conduit construction, according to which the pipe sections may be joined end to end in a rigid manner; which will provide a watertight connection between the sections; which will provide a joint having a maximum strength; with which motion of the abutting ends of the pipe sections within the connecting sleeve will be positively prevented; and which will be relatively simple and inexpensive.

A further object is to provide an improved method of joining pipe sections which will obtain the above objects in a simple, rapid, and inexpensive manner; and by means of which breakage of any portion of the welded connections during the welding operation will be avoided.

Various other objects and advantages will be apparent from the following description of several embodiments of the invention, and the novel features will be particularly pointed out hereinafter in connection with the appended claims.

In the accompanying drawing:—

Fig. 1 is an elevation of two pipe sections joined together in accordance with this invention, and illustrating one embodiment thereof;

Fig. 2 is a transverse sectional elevation through the joint of the same;

Fig. 3 is a front elevation of pipe sections, also connected in accordance with this invention and illustrating another embodiment thereof;

Fig. 4 is a similar elevation of a somewhat similar joint connection between two conduit sections of the type having a lap seam, and illustrating still another embodiment of the invention; and Fig. 5 is a transverse sectional elevation through the joint of the same.

Referring particularly to Figs. 1 and 2, metallic conduit sections 1 and 2 of cylindrical form are arranged in alignment and abutting end to end. A longitudinally slit metallic sleeve 3 is disposed telescopically over the abutting ends of the sections 1 and 2. The sleeve is of such size that when it is drawn tightly about the pipe sections, the edges thereof along the slit 4 will be in close proximity to one another. The sleeve may be drawn tightly about the sections in any suitable manner, such as by a chain tong or other suitable tool.

After the sleeve is drawn tightly about the conduit sections, it is secured thereto by welding, preferably by metallic arc welding. In metallic arc welding, a welding metal 5 is deposited by the arc along the junction of the surface to be united. The edges of the sleeve along the slit 4 are at the same time welded to one another, and through the slit the edges are welded to the abutting ends of the pipe sections. The metal 5, deposited in the welding operation, not only strongly connects the sleeve and sections but forms a watertight metallic connection between them, so that the joint between the two abutting sections provided by the sleeve will be watertight. The anchorage of the sleeve to the pipe sections along the slit 4 also prevents relative movement of the pipe sections within the sleeve, and therefore with the elimination of such motion the tendency of the pipe to tear loose or break the welded joint is avoided.

Preferably also the sleeve is provided in its interior area with a plurality of apertures 6, which expose portions of the inner ends of the pipe sections, and the edges or walls of the apertures are welded by metallic arc welding to the pipe sections which are exposed therethrough. This welding through the apertures not only provides a stronger connection between the sleeve and pipe sections owing to the greater linear extent of the weld, but also more firmly anchors the inner ends of the pipe sections to the sleeve, thus preventing any motion of the inner ends of each section in the sleeve. The drawing tight of the slit sleeve before welding also avoids any possibility of lost motion or looseness of the pipe sections in the sleeve which would tend to break the welded connection. At least some of the apertures 6 are preferably located at points in proximity to the line of abutment between the pipe sections, so that through at least some of the apertures abutting ends of the pipe sections will be exposed. Such exposed ends may be directly united to one another by the metal of the metallic arc welding at the same time that the aperture walls are welded to the abutting ends.

In Fig. 3 another embodiment of the invention is illustrated. The pipe sections 1 and 2 are connected by a sleeve 7 which is also provided with a longitudinal slit 8, similar to the slit 4 but disposed obliquely to the length of the sleeve, that is, obliquely to the length of the pipe sections being connected. The end edges 9 of the sleeve which encircle the pipe sections are made preferably irregular or undulatory in a direction lengthwise of the pipe sections, so as to provide a greater linear length of the end edges of the sleeve.

This sleeve 7 is drawn tightly upon the abutting ends of the pipe sections 1 and 2 in the manner described in connection with Fig. 1, and then secured by welding, preferably metallic arc welding, to the pipe sections as also explained in connection with Fig. 1. By reason of the undulatory end edges of the sleeve and the oblique slit 8 a maximum linear distance along which the sleeve is welded to the pipe sections is obtained, and thereby greater strength and rigidity is obtained by reason of the greater welded area. This sleeve may also be provided with apertures 10, similar to the apertures 6 and arranged so that the inner ends of the pipe sections will be connected to the sleeve at points distant from the end edges of the sleeve. Preferably at least some of the apertures are also arranged at the abutting edges of the pipe sections, so that the latter may be directly welded together at the same time that the sleeve is welded to the pipe sections.

In Figs. 4 and 5 still another embodiment of the invention is illustrated. In applying the invention to pipe sections 11 and 12, corresponding to sections 1 and 2, the simple sleeve as shown in Figs. 1 to 3 cannot be employed in connection with the conduit sections having a longitudinal lap seam. With such lap seam conduit sections, the sleeve 13 is made longer than the circumference of the pipe sections so that its edges at the slit will overlap with one another. Thus one edge portion 14 along the slit will be disposed in abutting relation along the lap seam as shown clearly in Fig. 5 and the other edge portion 15 along the slit of the sleeve will overlap with the portion 14 and abut face to face therewith as shown also more clearly in Fig. 5. The sleeve 13 will thus be in continuous contact with the pipe sections 11 and 12 along the entire end edges which encircle the pipe sections, and such edges may be welded to the pipe sections as explained in connection with the preceding embodiments.

The overlapping edge portions of the sleeve will also be welded to one another, and the sleeve may have apertures 16 corresponding to the apertures 6 and 10, enabling the pipe sections to be directly welded to one another at points along the abutting ends, and also enabling the welding of the abutting ends of the pipe sections directly to the interior area of the sleeve in order to prevent any motion within the sleeve of the inner ends of the conduit sections.

In order to secure a perfect weld between the sleeve and pipe sections, the procedure may be as follows. The two pipe sections are brought end to end and slightly spaced apart a suitable distance, such as one sixteenth or one eighth of an inch for example. The slit sleeve or band is then placed around the two abutting sections and drawn tightly therearound and the edges adjacent the slit tacked by welding to the pipe sections to hold the sleeve tightly thereover. The sleeve may be held tightly around the pipe sections by the tightening means instead of by the tacking welds although the latter is preferable for various reasons. The sleeve or band is welded along one end edge to one of the pipe sections, such as along the edge designated $a$ in Fig. 1. The other end edge of the sleeve or band is then welded to the other pipe section such as along the line $b$ in Fig. 1.

The next step is then to secure the pipe sections together directly through the apertures 6 which lie along the line of abutment between the pipe sections, as designated $c$. Then the edges of the sleeve along the slit are welded together as at $d$ and along the pipe sections and the sleeve then welded further to the pipe sections through the other apertures 6 as designated at $e$, which completes the welding operation. Thus the steps of the preferred form of welding are designated respectively $a$, $b$, $c$, $d$ and $e$.

It has been found by experience that when a different procedure in the welding takes place, the expansion and contraction of the pipe sections within the sleeve, which result from the welding operation, will frequently cause fracture of the first welded portions and the correction of such fractures is difficult and troublesome and often such fractures are not discovered until after the pipe has been put into use. By following the procedure above set forth, it has been found that the pipe sections can expand and contract during the welding operation without danger of fracturing the weld in the areas first welded, during the completion of the welding operation. The same procedure should preferably be followed for all the other embodiments of the invention.

In all of the different embodiments of the invention, the apertures are preferably of such size that they may be and preferably are filled with metal deposited in the arc welding operation, so that the joint between the pipe sections will be watertight. The slit sleeve in each of the cases is also in reality in the nature of a strap or band which is drawn tightly around the abutting ends of the pipe sections, the dimensions of the sleeve or strap being such that the edges will closely abut one another in the embodiments shown in Figs. 1 to 3 or slightly overlap as in the case of the embodiment shown in Figs. 4 and 5.

It will be observed that such a joint is exceptionally rigid since the butted ends of the pipe sections are securely anchored to one another and to the sleeve, so that they have no opportunity of moving in the sleeve when the connected sections are subjected to bending stresses such as would otherwise tend to cause a fracture of the weld. It will be also observed that by reason of the irregular or undulatory edges of the sleeve, not only is a greater linear length of the weld obtained which increases the strength of the joint, but the circumferential stresses in the pipe will be transverse to the line of the weld instead of along the same. A similar advantage is obtained by reason of the oblique slit 8 in Fig. 3, since the longitudinal stresses will be transverse to and not along the line of weld.

It will be also observed that by placing at least some of the holes at and along the line of abutment between the pipe sections I may obtain points of connection or weld between the pipe section and the sleeve at a maximum distance apart, which increases the rigidity of the connection between the sleeve and pipe sections. Thus greater leverage is obtained and through its greater rigidity in the joint. If desired, all of the apertures may be provided along the line of abutment between the pipe sections, or all in the interior area, or some or all slightly away from such line of abutment.

In the embodiments of the invention shown in Figs. 4 and 5, a satisfactory sleeve joint is obtained without large gaps, owing to the fact that the underneath lap 14 of the sleeve abuts up against the outside lap of the 13 abuts up against the outside lap of the seam of the pipe sections, thus making a flush joint between the sleeve and pipe sections entirely around the pipe sections.

It will be understood that various changes in the details, which have been herein described and illustrated for the purpose of explaining the nature of the invention, may be made by those skilled in the art within the principle and scope of the invention as expressed in the appended claims.

I claim:—

1. A conduit construction comprising two conduit sections approximately abutting end to end, a longitudinally slit sleeve surrounding and closely fitting the abutting ends of said sections, the abutting edges along the slit of the sleeve being in close proximity to one another, said sleeve being welded to said conduit sections along the ends and slit edges of the sleeve, and the abutting slit edges of the sleeve being welded to one another.

2. A conduit construction comprising two conduit sections approximately abutting end to end, a longitudinally slit sleeve surrounding and closely fitting the abutting ends of said sections, the abutting edges of the sleeve being united to one another and to the sections and the edges of the sleeve being also secured to said edges, by metallic arc welding.

3. A conduit construction comprising two conduit sections approximately abutting end to end, a strap surrounding and closely fitting the abutting ends of said sections, said strap having apertures therein in its interior area, said strap being welded to said sections through said apertures and along its conduit-encircling edges, the ends of the strap being also welded to one another.

4. A conduit construction comprising two conduit sections approximately abutting end to end, a strap surrounding and closely fitting the abutting ends of said sections, said strap having apertures in its interior area, said strap being welded to said sections through said apertures and along its conduit-encircling edges, the ends of the strap being also welded to one another, said welding being accomplished by metallic arc welding, whereby the deposited metal will seal the connection between the pipe sections and the strap, thereby making a sealed connection between the sections.

5. A conduit construction comprising two conduit sections approximately abutting end to end, a strap surrounding and closely fitting the abutting ends of said sections, the ends of the strap being in proximity to one another after encircling the sections, the ends of the strap being welded to one another, and the conduit-encircling edges thereof being welded to the sections, by metallic arc welding, whereby a tight sealed joint is established between said sections.

6. A conduit construction comprising two conduit sections approximately abutting end to end, a strap surrounding and closely fitting the abutting ends of said sections, the ends of the strap being in proximity to one another after encircling the sections, the ends of the strap being welded to one another and the conduit-encircling edges thereof being also welded to the sections, by metallic arc welding, whereby a watertight joint is established between said sections, the strap edges encircling the sections being undulatory in a direction lengthwise of the pipe sections, whereby the strap will be anchored to the sections along a maximum linear distance.

7. A conduit construction comprising two conduit sections approximately abutting end to end, a strap surrounding and closely fitting the abutting ends of said sections, the ends of the strap being in proximity to one another after encircling the sections, the ends of the strap being welded to one another and the conduit-encircling edges thereof being also welded to the sections, by metallic arc welding, whereby a sealed joint is established between said sections, said strap also having in its interior area a plurality of apertures adjacent the abutting ends of the pipe sections, and the strap being also welded to the pipe sections through said apertures, whereby a highly rigid connection between the strap and pipe sections is obtained.

8. A conduit construction comprising two conduit sections approximately abutting end to end, a strap surrounding and closely fitting the abutting ends of said sections, the ends of the strap being in proximity to one another after encircling the sections, the ends of the strap being welded to one another and the conduit-encircling edges thereof being also welded to the sections, by metallic arc welding, whereby a sealed joint is established between said sections, said strap also having in its interior area a plurality of apertures adjacent the abutting ends of the pipe sections and the strap being also welded to the pipe sections through said apertures, whereby a highly rigid connection between the strap and pipe sections is obtained, said apertures being located substantially at the abutting ends of said sections, whereby the latter may be welded to one another where exposed through the apertures.

9. A conduit construction comprising two conduit sections approximately abutting end to end, a strap surrounding and closely fitting the abutting ends of said sections, the ends of the strap being in proximity to one another after encircling the sections, the ends of the strap being welded to one another and the conduit-encircling edges thereof being also welded to the sections, by metallic arc welding, whereby a sealed joint is established between said sections, said strap also having in its interior area a plurality of apertures located adjacent the abutting ends of the pipe sections, said strap being also welded to the pipe sections through said apertures, whereby a highly rigid connection between the strap and pipe sections is obtained, the section-encircling edges of the strap being undulatory in a direction lengthwise of the pipe sections, whereby the strap will be secured to said sections along a maximum linear distance.

10. A conduit construction comprising two conduit sections approximately abutting end to end, a strap surrounding and closely fitting the abutting ends of said sections, the ends of the strap being in proximity to one another after encircling the sections, the ends of the strap being welded to one another and the conduit-encircling edges thereof being also welded to the sections, by metallic arc welding whereby a sealed joint is established between said sections, said strap also having in its interior area a plurality of apertures located adjacent the abutting ends of the pipe sections, and the strap being also welded to the pipe sections through said apertures, whereby a highly rigid connection between the strap and pipe sections is obtained, said apertures being located substantially at the abutting ends, so that the abutting ends of the sections may be welded to one another where exposed through the apertures, the section-encircling edges of the strap being undulatory in a direction lengthwise of the pipe sections, whereby the strap will be secured to said sections along a maximum linear distance.

11. A conduit construction comprising two conduit sections approximately abutting end to end, a longitudinally slit sleeve surrounding and closely fitting the abutting ends of said sections, the slit of the sleeve being oblique to the sleeve axis, the edges of the sleeve along the slit being secured to one another and to the abutting ends of the pipe sections and the section encircling edges being also secured to the pipe sections, both by metallic arc welding.

12. The method of joining abutting metallic conduit sections which comprises placing said conduit sections end to end, encircling the abutting ends with a closely fitting metallic strap, and securing together the ends of the strap and the edges of the strap to the received abutting ends by metallic arc welding.

13. The method of joining metallic conduit sections which comprises placing said sections end to end, surrounding said sections with a slit metallic sleeve, drawing said sleeve tightly upon the abutting ends of the sections, uniting together the edges of the sleeve along the slit and the section-encircling edges of the sleeve to the pipe sections, all by metallic arc welding.

14. The method of joining metallic conduit sections which comprises placing said sections end to end, surrounding the abutting ends of said sections by a longitudinally slit metallic sleeve having apertures in its interior area exposing portions of the abutting ends of the sections, drawing said sleeve tightly about the abutting ends and by metallic arc welding securing together the abutting edges of the sleeve and the same to the pipe sections, the section-encircling end edges of the sleeve to the pipe sections, connecting the edges of the apertures to the pipe sections and through the apertures directly connecting to one another the abutting ends of the pipe sections.

15. The method of joining metallic conduit sections, which comprises placing said sections end to end, and with the abutting ends slightly spaced from one another, surrounding said sections with a slit metallic sleeve, drawing said sleeve tightly about the abutting ends of the sections, welding one end edge of the sleeve to one pipe section, then welding the other end edge of the sleeve to the other pipe section, and then welding an intermediate portion of the sleeve to the pipe sections.

16. The method of joining metallic conduit sections, which comprises placing said sections end to end, and with the abutting ends slightly spaced from one another, surrounding said sections with a slit metallic sleeve, drawing said sleeve tightly about the abutting ends of the sections, welding one end edge of the sleeve to one pipe section, then welding the other end edge of the sleeve to the other pipe section, and then welding an intermediate portion of the sleeve to the pipe sections, and tacking the ends of the pipe to one another through openings in said sleeve.

17. The method of joining metallic conduit sections, which comprises placing said sections end to end, and with the abutting ends slightly spaced from one another, surrounding said sections with a slit metallic sleeve, drawing said sleeve tightly about the abutting ends of the sections, tacking the sleeve to the pipe sections to hold the sleeve tight, welding one end edge of the sleeve to one pipe section, then welding the other end edge of the sleeve to the other pipe section, and then welding an intermediate portion of the sleeve to the pipe sections.

18. The method of joining metallic conduit sections, which comprises placing said sections end to end, and with the abutting ends slightly spaced from one another, surrounding said sections with a slit metallic sleeve, drawing said sleeve tightly about the abutting ends of the sections, tacking the sleeve to the pipe sections to hold the sleeve tight, welding one end edge of the sleeve to one pipe section, then welding the other end edge of the sleeve to the other pipe section, and then welding an intermediate portion of the sleeve to the pipe sections, and tacking the ends of the pipe to one another through openings in said sleeve.

19. A conduit construction comprising two conduit sections approximately abutting end to end, a longitudinally slit sleeve surrounding and closely fitting the abutting ends of said sections, the slit of the sleeve being oblique to the sleeve length, the edges of the sleeve along the slit being secured to one another and to the abutting ends of the pipe sections, and the section-encircling edges being also secured to the pipe sections, both by metallic arc welding, the section-encircling edges of the sleeve being undulatory in a direction lengthwise of the sections, whereby the sleeve will be secured to the pipe sections along a maximum linear distance.

20. A conduit construction comprising two conduit sections approximately abutting end to end, a longitudinally slit sleeve surrounding and closely fitting the abutting ends of said sections, the slit of the sleeve being oblique to the sleeve length, the edges of the sleeve along the slit being secured to one another and to the abutting ends of the pipe sections, and the section encircling edges being also secured to the pipe sections, both by metallic arc welding, said sleeve also having apertures in its interior area and secured to said pipe sections by metallic arc welding through said apertures.

21. A conduit construction comprising two conduit sections approximately abutting end to end, a longitudinally slit sleeve surrounding and closely fitting the abutting ends of said sections, the slit of the sleeve being oblique to the sleeve length, the edges of the sleeve along the slit being secured to one another and to the abutting ends of the pipe sections, and the section encircling edges being also secured to the pipe sections, both by metallic arc welding, said sleeve also having apertures in its interior area and secured to said pipe sections by metallic arc welding through said apertures, at least some of said apertures being located substantially over the abutting ends of the pipe sections, and said pipe sections being also connected directly to one another by metallic arc welding where exposed through said apertures.

22. A conduit construction comprising two conduit sections approximately abutting end to end, a longitudinally slit sleeve surrounding and closely fitting the abutting ends of said sections, the slit of the sleeve being oblique to the sleeve length, the edges of the sleeve along the slit being secured to one another and to the abutting ends of the pipe sections, and the section-encircling edges being also secured to the pipe sections, both by metallic arc welding, said sleeve also having apertures in its interior area and secured to said pipe sections by metallic arc welding through said apertures, the section-encircling edges of the sleeve being undulatory in a direction lengthwise of the sections, whereby the sleeve will be secured to the pipe sections along a maximum linear distance.

23. A conduit construction comprising two conduit sections approximately abutting end to end, a longitudinally slit sleeve surrounding and closely fitting the abutting ends of said sections, the slit of the sleeve being oblique to the sleeve length, the edges of the sleeve along the slit being secured to one another and to the abutting ends of the pipe sections, and the section-encircling edges being also secured to the pipe sections, both by metallic arc welding, said sleeve also having apertures in its interior area and secured to said pipe sections by metallic arc welding through said apertures, at least some of the apertures being located substantially over the abutting ends of the pipe sections, and said pipe sections being also directly connected to one another by metallic arc welding through said apertures, the section-encircling edges of the sleeve being undulatory in a direction lengthwise of the sections, whereby the sleeve will be secured to the pipe sections along a maximum linear distance.

In witness whereof, I hereunto subscribe my signature.

JOHANNES KJEKSTAD.